Dec. 24, 1968    S. AUSNIT    3,417,675
METHOD OF MAKING A PLASTIC BAG AND A MAGNETIC
SLIDERLESS FASTENER THEREFOR
Original Filed March 10, 1965    3 Sheets-Sheet 1
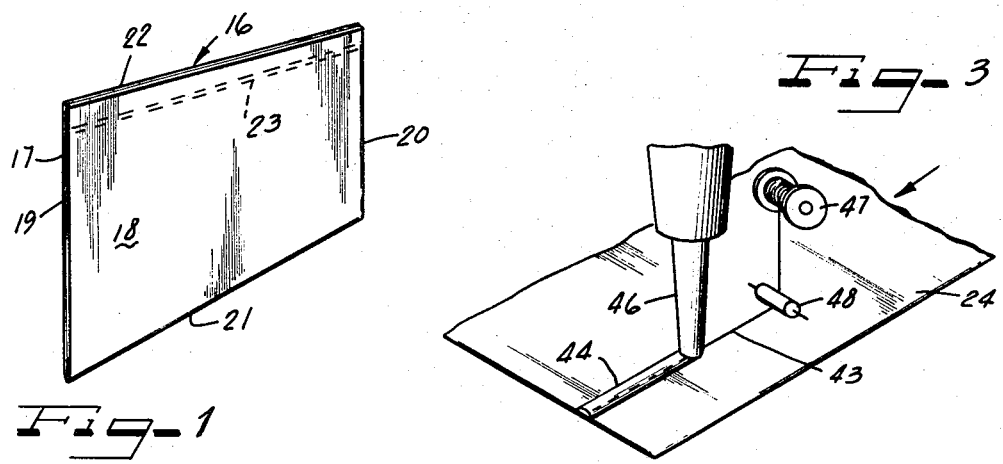
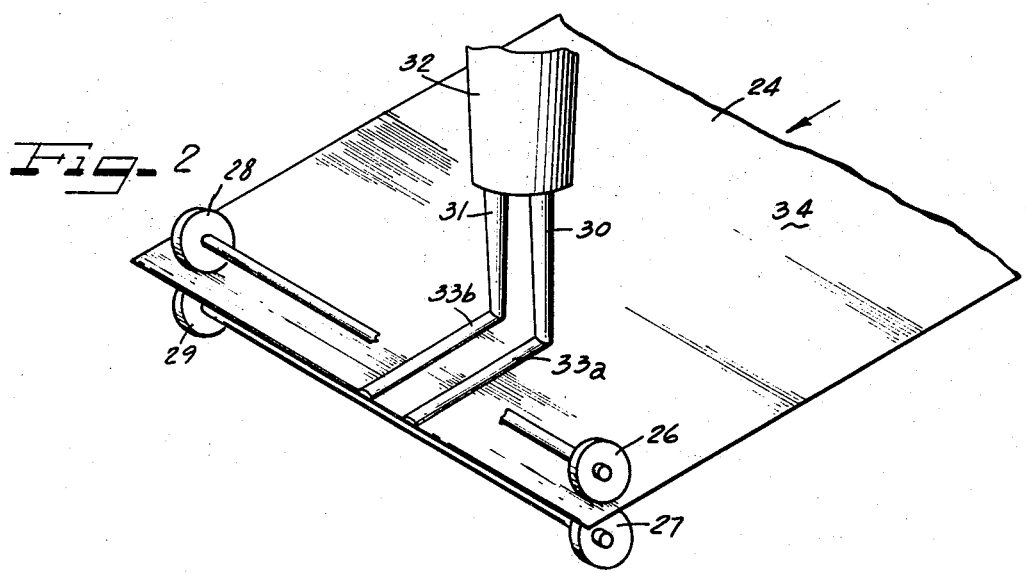
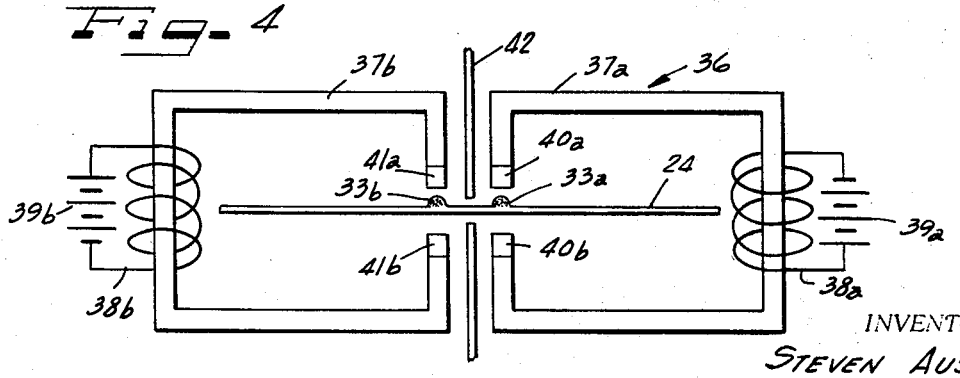
INVENTOR.
STEVEN AUSNIT
BY    ATTORNEYS

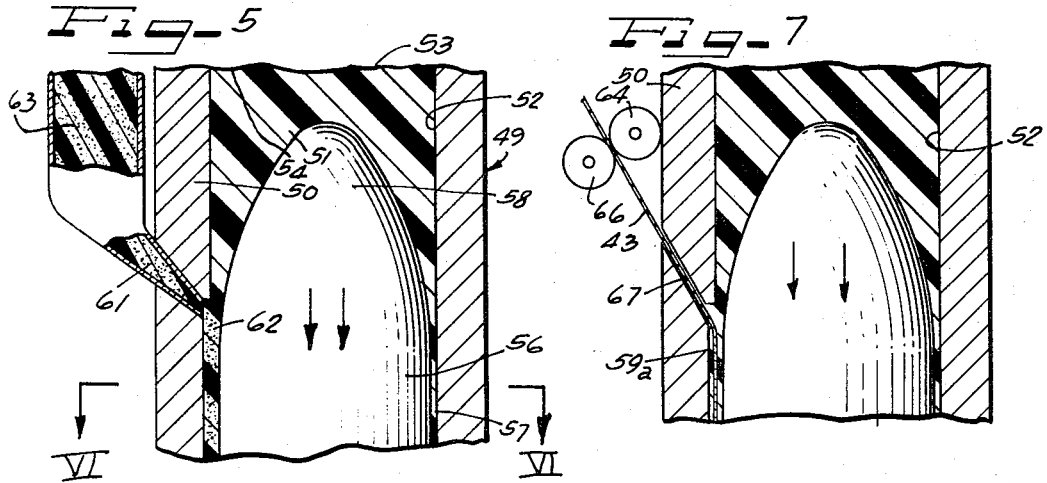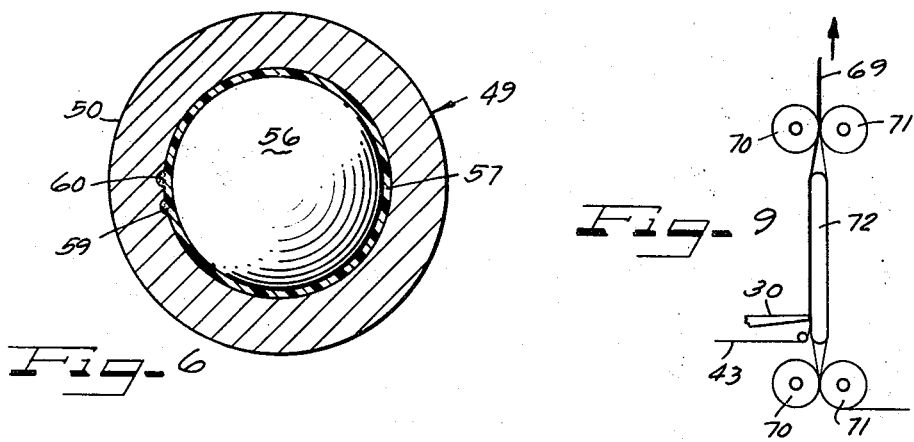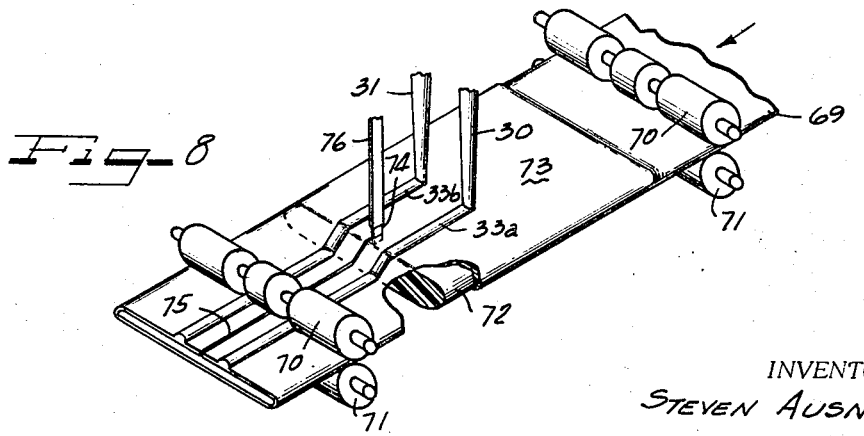

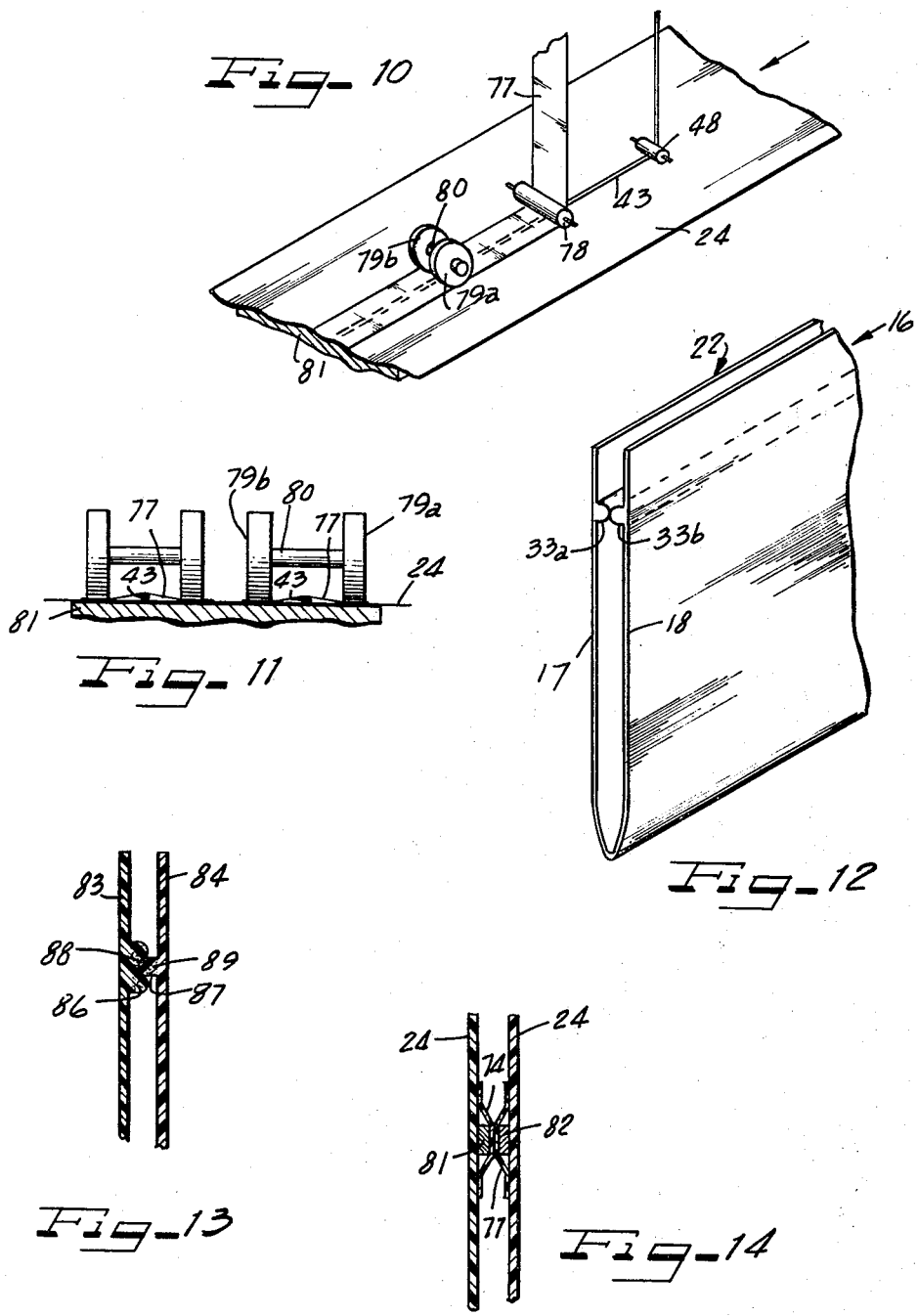

United States Patent Office 3,417,675
Patented Dec. 24, 1968

3,417,675
METHOD OF MAKING A PLASTIC BAG AND A MAGNETIC SLIDERLESS FASTENER THEREFOR
Steven Ausnit, 124 E. 61st St., New York, N.Y. 10021
Original application Mar. 10, 1965, Ser. No. 438,510, now Patent No. 3,326,399, dated June 20, 1967. Divided and this application Feb. 3, 1967, Ser. No. 613,821
5 Claims. (Cl. 93—35)

ABSTRACT OF THE DISCLOSURE

A method for making a magnetic plastic fastener comprising either forming integrally with or extruding on or bonding to a thermoplastic sheet one or more thermoplastic beads having embedded therewithin magnetizable wires or particles and magnetizing the wires or particles to form a closed magnetic circuit when a pair of the beads are brought into abutting engagement with one another. A similar method for making a plastic bag or pouch having such a magnetic plastic fastener.

Cross-references to related applications

This is a division of application Ser. No. 438,510, filed Mar. 10, 1965, now Patent No. 3,326,399.

Background of the invention

This invention relates generally to the field of sliderless fasteners or closures and more particularly to the field of magnetic sliderless fasteners and plastic bags having such fasteners.

Magnetic sliderless fasteners disclosed in the prior art generally comprise a piece of backup material to which is bonded a plurality of rigid or flexible magnetic segments which are attracted to correspondingly similar segments of reversed polarity bonded to a second piece of backup material. The corresponding segments of the two pieces of backup material are held together when brought into abutting engagement with one another. In some instances the various magnetic segments on each of the pieces of backup material are in mutually spaced relation whereas in other instances adjacent segments are contiguous with one another. Furthermore the abutting surfaces of the corresponding magnetic segments on the two pieces of backup material have been disclosed both as being flat as well as having diverse configurations.

In such prior art arrangements the various segments must be accurately oriented so that when the two pieces of backup material are brought together each of the segments is brought precisely into abutting engagement with its corresponding segment. The problem of accurately orienting the segments is even more critical when not all of the mating surfaces of corresponding segments are coplanar and the two pieces of backup material must be adjusted relative to one another until the matching surfaces of corresponding segments are brought into proper alignment with each other.

Other deficiencies in many of the known arrangements involve an unnecessary bulkiness of the magnetic sliderless fasteners, leakage between the magnetic segments and the backup material or between the backup material and the bag or a similar device on which the fastener is mounted and excessive costs in the manufacture of the fasteners or bags and similar articles which employ magnetic sliderless fasteners or both.

Summary of the invention

The present invention eliminates or greatly reduces the deficiencies of the prior art by providing a relatively inexpensive method of making a magnetic sliderless fastener and a bag or similar article having a magnetic sliderless fastener. In accordance with the principles of this invention magnetizable wires or particles are embedded within thermoplastic beads which are either formed integrally with or extruded on or bonded to a thermoplastic sheet. A single bead may be provided on a single thermoplastic sheet for use with a similarly beaded thermoplastic sheet to form a fastener. On the other hand a pair of spaced parallel beads may be provided on a single thermoplastic sheet which is subsequently folded to form a bag, or a pair of beads can be provided on a tubular thermoplastic sheet which is subsequently slit between the beads to form the sides of a bag.

Highly accurate orientation of the magnetizable wires or particles in a pair of mating beads is obviated. Furthermore the size of the beads are materially reduced and a diminutive fastener can be provided for very small bags or pouches. Leakage between the beads and their respective thermoplastic sheets can be eliminated and the costs involved in the manufacture of magnetic sliderless fasteners or bags which employ such fasteners can be materially reduced.

It is, therefore, an object of the present invention to provide a method for relatively inexpensively manufacturing sliderless fasteners or closures of the magnetic type.

Another object of the invention is to provide a method of extruding thermoplastic sheets with magnetic holding means formed thereon for use in making sliderless fasteners.

Still another object is to provide a method for making a thermoplastic sheet with an integral bead of thermoplastic material formed thereon incorporating or having embedded therewithin a magnetizable substance for forming a magnetic sliderless fastener.

Another object of the invention is to provide a method of making a thermoplastic sheet having a magnetizable wire mounted on the sheet by means of heat-sealed thermoplastic tape, whereby the sheet can be subsequently cut into sections and sliderless fasteners formed therefrom quickly and relatively inexpensively.

Another object of the invention is to provide a method for forming pouches and the like containers whereby a tubular thermoplastic film is extruded with means formed thereon to provide a magnetic sliderless fastener, and thereafter slit and sealed at the ends to form the container.

Still another object of the invention is to provide a method for continuously extruding a thermoplastic bead on a running flat or tubular thermoplastic film incorporating therein or otherwise having bonded thereto a magnetizable substance or wire to provide an integral sliderless fastener of the magnetic type on the film.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

Brief description of the drawings

FIGURE 1 is a perspective view of a container formed in accordance with the principles of the present invention and incorporating a sliderless fastener or closure of the magnetic type;

FIGURE 2 is a perspective view of one embodiment of the invention whereby a bead of thermoplastic material having magnetizable particles therein is extruded directly onto a thermoplastic sheet;

FIGURE 3 is a perspective view of another embodiment of the invention similar to that illustrated in FIGURE 2 but including provisions for laying out along the thermoplastic sheet a magnetizable wire ahead of the extruded bead to be covered by and bonded to the sheet by the bead;

FIGURE 4 is a schematic wiring diagram showing means for permanently magnetizing the magnetizable substance in a pair of beads formed on a thermoplastic sheet whereby the polarity of the two beads is reversed with respect to one another;

FIGURE 5 is a vertical cross-sectional view of an extrusion die constructed in accordance with the principles of the invention;

FIGURE 6 is a sectional view taken along lines VI—VI of FIGURE 5;

FIGURE 7 is a vertical cross-sectional view of another embodiment of an extrusion die constructed in accordance with the invention;

FIGURE 8 is a perspective view of apparatus constructed so as to continuously extrude one or more beads on a running tubular thermoplastic film and to simultaneously longitudinally slit the film;

FIGURE 9 is a schematic view of another form of the apparatus shown in FIGURE 8;

FIGURE 10 is a perspective view of another embodiment of the invention whereby a thermoplastic tape is heat-sealed to a thermoplastic film by means of a roller to hold a length of magnetized wire on the sheet;

FIGURE 11 is a front of the apparatus of FIGURE 10 but shows a pair of roller members instead of only one;

FIGURE 12 is an enlarged fragmentary perspective view of a pouch or container formed of extruded thermoplastic sheet material and constructed in accordance with the principles of the present invention;

FIGURE 13 is an enlarged fragmentary vertical sectional view of a top portion of a pouch similar to that illustrated in FIGURE 12 and showing a pair of beads having magnetizable particles therein formed on the opposite sides of the pouch to provide a magnetic sliderless fastener; and FIG 14 is similar to FIGURE 13 but shows the magnetic fastener formed of a pair of elongated wires or rods carried on the opposite sides of the pouch by means of thermoplastic tape heat-sealed to the sides of the pouch.

*Description of the preferred embodiments*

FIGURE 1 illustrates an exemplary article to which the principles of the present invention may be advantageously applied and which comprises a pouch-like container indicated generally at reference numeral 16 having a pair of opposi.e or confronting sides 17 and 18 joined together at ends 19 and 20 thereof.

Sides 17 and 18 are formed of thin, flexible sheet-form material which may constitute a single piece folded over at a bottom end 21 or which may be formed of two separate pieces suitably joined at the ends 19 and 20 and at the bo:tom 21. An open top end 22 is provided with a magnetic sliderless fastener or closure means 23 for selectively closing the top end 22 whereby the interior of the container is rendered substantially air-sealed.

The sides 17 and 18 of the container 16 may be constituted of a variety of fabrics or other materials having various degrees of strength, flexibility, etc. In addition the container may be formed of a single piece or sheet of thermoplastic material such as polyethylene and containers made of such material have met with a high degree of commercial success.

The closure or fastener means 23, which is effective in joining together the two sides 17 and 18 of the container along the upper margins thereof, is of the magnetic sliderless type and comprises a permanently magnetized substance carried on the facing walls of the container sides. The polarity of the magnetized substances on the two sides is reversed with respect to one another and alignable with one another across substantially the entire width of the container.

In order to close the container 16 it is merely necessary to urge the upper margins of sides 17 and 18 together whereupon the magnetic fastener 23 forms a longitudinal closed magnetic circuit to maintain the two sides in joined-together relation. The container can be opened by merely urging the top margins of the two sides apart, thus providing quick access into the container.

As the following description proceeds it will be appreciated that the principles of the invention find utility in a variety of other applications wherein it is desirable to fasten or join together two surfaces or fabrics or the like. The exemplary applications of the invention particularly described herein do not and are not intended to limit the general appiicabiiity of the principles of the invention.

In general, the fastener 23 requires a pair of thermoplastic sheets which may, in some instances, constitute the two members or surfaces to be joined together by the fastener or, in other instances, may be secured to such members. In the exemplary container illustrated in 16, for example, sides 17 and 18 are made of thermoplastic material and therefore may constitute themselves the thermoplastic sheets of the fastener 23.

A narrow extent of magnetic or magnetizable material is carried on each of the thermoplastic sheets and one aspect of the present invention resides in the provision of a method and apparatus for joining or bonding such magnetizable material to the sheets.

Referring to FIGURE 2, a flat sheet of thermoplastic material such as polyethylene is denoted at 24 and the sheet extends through the nips defined by rolls 26–29. A pair of nozzles 30 and 31 extend from an outlet 32 of the plastic extrusion machine and the rolls 26–29 are rotatable to provide relative movement between the sheet 24 and the nozzles 30 and 31 in the plane of the sheet.

The nozzles 30 and 31 extrude a pair of beads 33a and 33b of thermoplastic material on a top surface 34 of the sheet 24. The two beads 33a and 33b are situated in spaced, parallel relation, and it will be appreciated that upon continuous movement of the sheet 34 relative to the nozzles 30, 31 the beads 33a and 33b may be continuously formed along the length of the sheet.

The extrudate which forms beads 33a and 33b may comprise a thermoplastic binder mixed with finely divided particles capable of being permanently magnetized, for example, barium ferrite. Such extrudate is known in the art, and as it is laid in a melted condition along the sheet it becomes permanently bonded thereto and monolithic or integral therewith.

The sheet 24 may then be passed through a magnetizing station as indicated generally at 36 in FIGURE 4 in order to permanently magnetize the particules within the beads 33a and 33b. Magnetizing station 36 may comprise a pair of electromagnets 37a and 37b around which are wound a pair of inducing coils as at 38a and 38b connected, respectively, to a source of direct current as denoted at 39a and 39b.

Each of the electromagnets has a pair of spaced-apart pole pieces. For example, magnet 37a comprises pole pieces 40a and 40b, and the polarity of the two may be such that pole piece 40a is north and 40b is south. Magnet 37b has a pair of pole pieces 41a and 41b, but pole piece 41a is a south pole while 41b is north. It will be appreciated, therefore, that the polarity of the pole pieces of electromagnets 37a and 37b are reversed with respect to one another.

As a consequence the magnetizable particles in the top portion of bead 33a as illustrated in FIGURE 4 will be charged as a south pole along the length thereof as the bead is passed between pole pieces 40a and 40b of the electromagnet 37a, the particles in the bottom portion of bead 33a will be charged oppositely, or as a north pole, along the length of the bead.

On the other hand, the magnetic particles in the top portion of bead 33b will be given a north polarity, while the particles in the bottom portion thereof will be oppositely charged.

In order to prevent the magnetic lines of the pole pieces of the two electromagnets from interferring with one another a magnetic shield 42 extends therebetween shielding the lines of force emanating from one magnet, from the other magnet.

It will be appreciated that after the thermoplastic sheet 24 has been passed through the magnetizing station 36, the sheet can be slit along the length thereof between beads 33a and 33b to provide the two magnetic portions of the fastener 23.

In another form of the invention as illustrated in FIG-URE 3, a length of magnetizable wire 43 is laid along a portion of a thermoplastic sheet 24 and a bead 44 of thermoplastic material (free of magnetic particles) is extruded from a die 46 along the sheet 24 to completely cover the wire 43 and to bond the wire to the sheet.

The wire 43 can be continuously unwound from a reel 47 and trained around a roll 48 onto a travelling sheet to render the operation continuous and the wire 43 can be permanently magnetized by passing it through the magnetizing station 36 either before or after it has been bonded to the sheet 24.

In another form of the invention the thermoplastic sheet of the fastener can be extruded, with the beads containing the magnetizable particles or wire formed thereon during the extrusion operation.

For example, referring to FIGURES 5 and 6 an extrusion die indicated generally at 49 comprises a housing 50 having formed therein a cylindrical bore 51 formed by a bore wall 52 extending longitudinally through the housing 50. An upstream end 53 of the housing is connected to a supply of melted thermoplastic indicated at 54 which is forced through the bore 51 in the direction of the arrow to an outlet at the opposite or downstream end of the housing 50. Although in the embodiment illustrated the thermoplastic flows downwardly, it will be appreciated by those skilled in the art that in many extrusion operations the flow of the thermoplastic is upwardly, and the principles of the present invention are equally applicable to that as well as other flow arrangements.

A torpedo or cylindrical mandrel 56 is situated concentrically within the bore 51 and has a reduced diameter with respect thereto to form an annular space 57 between the mandrel and the bore wall 52. The melted thermoplastic is forced around the mandrel and through the annular space 57 to form a tubular film at the outlet of the die.

The mandrel 56 comprises a substantially conical end portion 58 which tapers toward the upstream end of the housing 50, and formed in the bore wall 52 are a pair of grooves 59 and 60 which extend along the length of the bore wall from a point adjacent the enlarged end of the conical end portion 58 of the mandrel and which open into the annular space 57. A passage 61 is formed in the housing 50 and extends therethrough to communicate an upstream end 62 of the grooves with a source of pressurized melted thermoplastic containing magnetizable particles as indicated at 63.

Thus, as a tubular film of thermoplastic is extruded in the die 49, one or more longitudinally extending beads of thermoplastic having magnetizable particles therein may be extruded and formed on the sheet during the same extrusion operation.

In similar manner a magnetizable wire 43 may be bonded to the tubular film of thermoplastic during the extrusion process, as shown in FIGURE 7. In this form of the invention the wire 43 is directed by means of a pair of rollers 64 and 66 through a passageway 67 formed in the die housing 50 and into a longitudinal groove 59a formed in the bore wall 52. Thus, as the tubular film of thermoplastic is extruded the magnetizable wire can be embedded in a thermoplastic bead formed on the film during the same extrusion operation.

The forms of the invention illustrated in FIGURES 5-7 find particular utility in the manufacture of plastic containers such as pouches, since a pair of beads can be formed on the film as shown in FIGURES 5 and 6, and thereafter the tubular film can be slit between the beads and formed into a pouch as shown at reference numeral 16 in FIGURES 1 and 12.

Other forms of the invention which also find utility in the formation of such plastic pouches are shown in FIG-URES 8 and 9. In FIGURE 8 a tubular film of thermoplastic shown at 69, which has been previously formed in an extrusion die, travels between the nips of spaced pairs of rollers 70 and 71 and around a mandrel 72 situated between the pairs of rollers. The mandrel 72 is dimensioned with respect to the tube 69 such that a top portion 73 of the tube is pulled snugly laterally across the adjacent top portion of the mandrel 72.

A pair of extruder nozzles 30 and 31 are situated so as to extrude a pair of thermoplastic beads 33a and 33b on the top portion 73 of the film 69 as it passes across the mandrel 72.

The thermoplastic material which forms the beads 33a and 33b may contain magnetizable particles, although it will be apparent that magnetizable wire, as indicated at 43 in FIGURE 3, may be laid out on the film 69 and bonded to the film by means of the beads.

A cutter blade or similar slitting or device 74 is connected to an arm 76, or may extend upwardly from the mandrel 72, to slit the film 69 as at 75 between the beads 33a and 33b, whereupon the beaded film can be passed through a magnetizing station 36 and cut into predetermined lengths and reversely folded to form a pouch as shown in FIGURES 1 and 12.

The spaced pairs of rolls 70 and 71, while serving to move the film longitudinally, also serve to maintain the mandrel 72 in a given position within the tubular film 69 with respect to the extruder nozzles 30 and 31.

In another form of the invention shown in FIGURE 9 the film 69 runs upwardly past the rolls 70 and 71 and across the mandrel 72, rather than horizontally as shown in the embodiment of FIGURE 8. FIGURE 9 also illustrates the magnetizable wire 43 being laid on the film 69 ahead of an extruder nozzle 30 for bonding the wire to the film.

In another form of the invention shown in FIGURE 10 a magnetizable wire 43 is extended along the length of a thermoplastic sheet 24 and is maintained on the sheet by means of a length of thermoplastic tape 77 which is substantially wider than the wire 43 and is directed over the wire by means of a roller 78. The tape 77 is thereupon heat-sealed to the sheet 24 by suitable means such as a pair of spaced heated wheels 79a and 79b rotatably mounted on an axle 80. The wheels press the tape 77 against the sheet 24 as the tape and the sheet pass between the wheels and a backing support plate 81 which supports the sheet on a side opposite the wheels.

The sheet 24 can be thereupon passed through a magnetizing station 36 if the wires 43 have not as yet been magnetized. If a pair of wires have been sealed to the sheet as shown in FIGURE 11, the sheet can be thereupon slit between the tapes 77.

In order to increase the magnetic effect of the wires 43 without increasing the diameters thereof the wires can be formed with a rectangular cross-section in the form of a rod as shown in FIGURE 14. A pair of magnetizable rods 81 and 82 are sealed on sheets 24 by means of a pair of thermoplastic tapes 77, 77 and it will be appreciated that such rectangular configuration of the wire can also be advantageously employed in that form of the invention shown in FIGURE 3.

FIGURE 13 is illustrative of a different form of thermoplastic beads whereby the magnetic effect of the beads is increased. As shown, a pair of thermoplastic beads 86 and 87 containing magnetizable particles are extruded, respectively, on a pair of thermoplastic sheets 83 and 84. Bead 86 is formed with a longitudinal groove 88 therein to receive in abutting engagement a complementarily formed portion 89 of the bead 87. The magnetic attraction of the two beads, and therefore the fastening or closing and sealing effect of the bead is increased through the utilization of the configuration of the beads as shown in FIGURE 13, as well as in similar cross-sectional configurations wherein the areas of the abutting surfaces of the oppositely magnetized beads is increased.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

I claim as my invention:

1. In a method of making a bag or similar container of thermoplastic material having a magnetic fastener thereon comprising the steps of:
   continuously extruding a flexible tubular film of thermoplastic material,
   continuously advancing the film along a mandrel which is sized with respect to the film, such that the film is tensioned in a lateral direction over the mandrel as it advances therealong,
   extruding on the tensioned film passing along the mandrel and at the mandrel a pair of elongated spaced parallel beads of thermoplastic material containing magnetizable particles,
   slitting the tube along the length thereof between said pair of beads and then slitting the tube transversely of the length thereof,
   reversely folding the slit tube into the form of a bag having open ends with the beads facing each other, and then sealing the open ends of the bag.

2. The method of making a thermoplastic structure having a magnetic fastener thereon comprising the steps of:
   continuously extruding a film of thermoplastic material,
   continuously advancing the film across a supporting mandrel,
   continuously laying out on the film at the mandrel a pair of longitudinally extending spaced parallel magnetizable wires, and
   continuously extruding on the film over the wires and at the mandrel a pair of beads of thermoplastic material to cover the wires and to permanently bond the same to the film.

3. In a method of making a bag or similar container of thermoplastic material having a magnetic fastener thereon comprising the steps of,
   continuously extruding a flexible tubular film of thermoplastic material,
   continuously advancing the film around a mandrel which is sized with respect to the film so that one portion of the film is tensioned in a lateral direction as it advances around the mandrel,
   laying out on the tensioned film a pair of spaced parallel lengths of magnetizable wire,
   extruding a pair of thermoplastic beads to the tensioned film over said wires and along the lengths thereof to cover and to permanently bond the wires on the film, and
   slitting the film along the length thereof between said pair of beads.

4. The method as defined in claim 3 and including the steps of,
   permanently magnetizing said wires,
   reversely folding the slit film to enable the beads to be brought into engagement with one another along the lengths thereof, cutting the film into lengths, and
   sealing the longitudinal ends of the lengths of film to form a plurality of bags.

5. The method of making a bag or similar container of thermoplastic material having a magnetic fastener thereon comprising the steps of,
   continuously extruding a flexible tubular film of thermoplastic material,
   advancing the film around a mandrel which is sized with respect to said film such that said film is tensioned in a lateral direction as it advances around said mandrel,
   continuously extruding a pair of elongated spaced parallel beads of thermoplastic material containing magnetizable particles to the tensioned film,
   slitting the tube along the length thereof between said pair of beads,
   magnetizing the particles within said beads cutting the film into successive lengths, and sealing the ends of the lengths to form magnetically closable bags.

References Cited

UNITED STATES PATENTS

| | | | |
|---|---|---|---|
| 2,412,429 | 12/1946 | Slingluff et al. | 264—174 |
| 2,677,910 | 5/1954 | Morgan. | |
| 2,736,921 | 3/1956 | Mulbarger et al. | 264—171 |
| 2,835,993 | 5/1958 | Whitehead. | |
| 2,887,721 | 5/1959 | Blanchi et al. | 264—22 X |
| 2,959,832 | 11/1960 | Baermann. | |
| 3,051,988 | 9/1962 | Baermann | 264—22 |
| 3,082,292 | 3/1963 | Gore | 264—174 X |
| 3,090,991 | 5/1963 | Hathaway | 264—146 X |

ROBERT F. WHITE, *Primary Examiner.*

T. J. CARVIS, *Assistant Examiner.*

U.S. Cl. X.R.

18—13; 264—22, 146, 149, 150, 173, 174, 250, 277, 279